United States Patent
Hagn (10) Patent No.: US 6,575,360 B1
(45) Date of Patent: Jun. 10, 2003

(54) DEVICE AND METHOD FOR PERSONALIZING CHIP CARDS

(75) Inventor: Thomas Hagn, Munich (DE)

(73) Assignee: BetaResearch (DE)

( * ) Notice: Subject to any disclaimer, the term of this patent is extended or adjusted under 35 U.S.C. 154(b) by 0 days.

(21) Appl. No.: 09/423,851

(22) PCT Filed: May 15, 1998

(86) PCT No.: PCT/DE98/01360
§ 371 (c)(1),
(2), (4) Date: Nov. 15, 1999

(87) PCT Pub. No.: WO98/52150
PCT Pub. Date: Nov. 19, 1998

(30) Foreign Application Priority Data

May 15, 1997 (DE) .......................... 197 20 431

(51) Int. Cl.⁷ .................. G06K 5/00; G06K 17/00; G06K 19/06
(52) U.S. Cl. ............ 235/380; 235/382; 235/487; 235/492
(58) Field of Search ............... 235/380, 382, 235/379, 492, 383, 487

(56) References Cited

U.S. PATENT DOCUMENTS

| | | | |
|---|---|---|---|
| 4,701,600 A | 10/1987 | Beech et al. ............ | 235/375 |
| 4,825,054 A | 4/1989 | Rust et al. ............. | 235/380 |
| 4,874,935 A | 10/1989 | Younger ................ | 235/492 |
| 5,339,402 A | * 8/1994 | Ueda ................... | 395/425 |
| 5,534,857 A | 7/1996 | Laing et al. .......... | 340/825.34 |
| 5,557,679 A | 9/1996 | Julin et al. ........... | 380/23 |
| 5,712,472 A | * 1/1998 | Lee .................... | 235/486 |
| 5,889,941 A | * 3/1999 | Tushie et al. .......... | 395/186 |
| 5,942,738 A | * 8/1999 | Cesaire et al. ......... | 235/380 |

FOREIGN PATENT DOCUMENTS

| | | | | |
|---|---|---|---|---|
| DE | 39 27 270 C2 | 8/1989 | ......... | G06K/19/073 |
| DE | 40 36 765 A1 | 11/1990 | ......... | G06K/19/073 |
| DE | 41 19 924 C3 | 6/1991 | ......... | G06F/12/14 |
| DE | 44 06 602 A1 | 3/1994 | ......... | H04L/9/32 |
| DE | 195 17 818 C2 | 5/1995 | ......... | G07F/19/00 |
| DE | 195 17 818 A1 | 5/1995 | ......... | G07F/19/00 |
| DE | 195 36 548 A1 | 9/1995 | ......... | G06F/9/45 |
| EP | 0 055 986 B1 | 5/1986 | ......... | G07F/7/10 |
| EP | 0 256 921 A1 | 7/1987 | ......... | G06K/17/00 |
| EP | 0 266 926 A2 | 10/1987 | ......... | G06K/17/00 |
| EP | 0 275 510 A2 | 12/1987 | ......... | G07F/7/10 |
| EP | 0 744 708 A2 | 11/1996 | ......... | G06K/17/00 |
| WO | WO 93/10509 | 5/1993 | ......... | G06K/19/073 |

OTHER PUBLICATIONS

B. Kowalski et al., "Trust Center for Public Networks", *Informationstechnik it* (1990) 32:1.
V.K. Milczewsky, "Merh Sicherheit auch bei Btx", *Funkschau* (1988) 24.

* cited by examiner

Primary Examiner—Karl D. Frech
Assistant Examiner—April Nowlin
(74) Attorney, Agent, or Firm—Gray, Cary, Ware & Freidenrich (57) ABSTRACT

Procedures for the performance of electronic chip-card personalization and/or initialization and/or a chip-card application, characterized by the following procedural steps: contacting the chip card by a first device; setting up or providing a connection between the first device and a separate second device designed to establish a logical communication link to provide for communication between the chip card and the second device via the first device; requesting the performance of chip-card personalization and/or initialization and/or a chip-card application, with the request directed to the first device by the second device; and performing the requested chip-card personalization and/or initialization and/or the requested chip-card application by way of a transparent transfer of data and/or commands back and forth between chip card and second device via the logical communication link.

7 Claims, 3 Drawing Sheets

DEVICE AND METHOD FOR PERSONALIZING CHIP CARDS

The present invention concerns a device and a procedure for the personalization of chip cards.

Chip cards are used in many systems with high security requirements in order to provide internal keys to system clients locally without these keys being accessible when the system is circumvented. Chip cards are used as security or authorization ID and provide the means for secure authentication and encoding of data streams via the keys and algorithms stored on them. Data stored in chip cards during initialization and personalization may be accessed only by authorized systems following proper authentication, a procedure checking authorization.

Examples of areas of application for systems featuring chip cards include mobile communication systems, bank systems using bankcards and pay-per-view TV systems.

During the initialization and personalization of chip cards, the data required for subsequent use are programmed into the chip of the chip card. These chip-card life-cycle processing steps, which in a way are still part of the production stage, in this context represent processes subject to the highest security requirements. For instance, during initialization and personalization, keys are included in the card that are required for subsequent card use but may also, if reconnoitered, jeopardize the security of the entire application system of the chip cards.

During initialization, for example, a chip card is "programmed." This means that data are introduced to the chip card, enabling the latter to perform the function assigned to it. In the case of personalization, at least a part of the data put on the chip card is unique, meaning it is different for each individual chip card, thereby individualizing and "personalizing" the chip card. The data transferred as part of such processes commonly also include data relevant to security, such as keys; however, the sequence of commands, too, as well as their structure and contents as regards the execution of personalization or initialization already represent information critical to security, which should be accessible to as few people as possible.

In conventional systems in the area of chip-card personalization, the component in control of process logic—i.e., of the command sequence of chip-card personalization—is an integral part of the system, which also executes card handling and card contacting. Card handling in this context means making the chip card accessible for commands and exterior data or, in other words, the execution of basic requirements in terms of elementary physical hardware and software functions, such as contacting the card and supplying the card with the necessary operating voltage, but also causing the card to be reset in order to enable it to communicate with the outside world.

This means that the logic, on which chip-card personalization is based, as well as the appertaining algorithms and keys are anchored in this system and thus must be disclosed to the system supplier and stored in the system. As a result, the manufacturers of personalization systems must be given security-related information about the logic of chip-card personalization, about parts of the chip-card command interface as well as about algorithms and keys. The distribution of information with such a high degree of security represents an increased security risk. Knowledge of the chip cards' logic facilitates trespasses into the chip's security mechanisms on the card. Security lapses that were introduced to the systems by the manufacturer intentionally or unintentionally might result in chip cards being compromised and keys being reconnoitered and thus jeopardize the chip card's application system.

Therefore, it is the purpose of the present invention to create a device and a procedure for the personalization of chip cards that feature increased security.

Another purpose of the present invention is to separate security logic (e.g., command sequence of personalization, authentication, etc.) and card handling. However, the communication path and the application's requirement should be predetermined by the system contacting the chip cards.

A significant aspect of the present invention is that personalization, initialization or critical chip-card applications are to be performed by a separate security system, in which electronic administrative processing steps (personalization, initialization) and critical applications of chip cards (authentication) are separated within the chip-card life span between the system and card handling or chip contacting.

The process logic of electronic chip-card personalization and initialization, the chip-card command interface, which is the software interface representing the command set available to the chip card, as well as algorithms and the keys needed for personalization are implemented in a central security system that can execute these tasks when prompted by a so-called chip-card control system in charge of card handling and contacting.

The system for card handling and contacting sees to it that a so-called logical communication link is set up between the card's chip and the security system for electronic personalization and initialization.

In this context, a communication link is a connection between two partners engaging in communication. This connection may be used to exchange data and does not necessarily provide a direct link between the two partners but can be routed via one or several intermediate stops, to the effect that, in the place of an actual direct link, an indirect or "logical connection" exists between the partners. In such a case, the communication points are not connected to one another directly but along a data path setting up a link or connection between the two communication end points and providing a data path or "logical communication link," which is used to provide the means for a proper exchange of data between the communication end points—regardless of the actual hardware connection path between the two communication end points, be it directly or indirectly. The logical communication link to be used is communicated to the central security system as part of a request for the performance of chip-card personalization or another chip-card application.

The central system for the performance of chip-card personalization, initialization, configuration or the execution of a chip-card application in a favorable embodiment example provides the means for contacting various card-handling systems or so-called chip-card control systems. The system contains a request of a chip-card control system for the performance of chip-card personalization, initialization or an application and, subsequently, performs the requested process logic (e.g., personalizing a chip card)—i.e., the corresponding sequence of commands and data—via a logical communication link, which represents a data path between the central system and the chip card.

The request directed to the central system for chip-card personalization, initialization, configuration or for the execution of a chip-card application carries the information required for the execution of the requested application or the process logic corresponding to it—i.e., the corresponding command sequence. Such information could pertain to the communication protocol to be applied. If, for the sake of clarity, mention is made below of only one requested application, it should be assumed that the requested application, in addition to other chip-card applications, may well be chip-card personalization or initialization.

The communication of the commands and messages to and from the chip card occurs in a transparent fashion—i.e., the relayed data is transferred unchanged between the communication partners involved or, in other words, the data dispatched from one end point of communication (chip card or central system) to another (central system or chip card) reach their destination having undergone no change of any kind. Such transparent communication links are provided or set up by the system and enable the control system to proceed with card handling and card contacting. The communication path, which is the entry point of the logical communication link in the chip-card control system that is to serve as the communication medium, and the communication protocol are communicated to the central security system when an application is requested.

Below, the present invention is detailed using several embodiment examples in reference to the attached illustrations, of which.

Below, the elements of a first embodiment example of the invention are explained in reference to FIG. 1.

Figure 1:
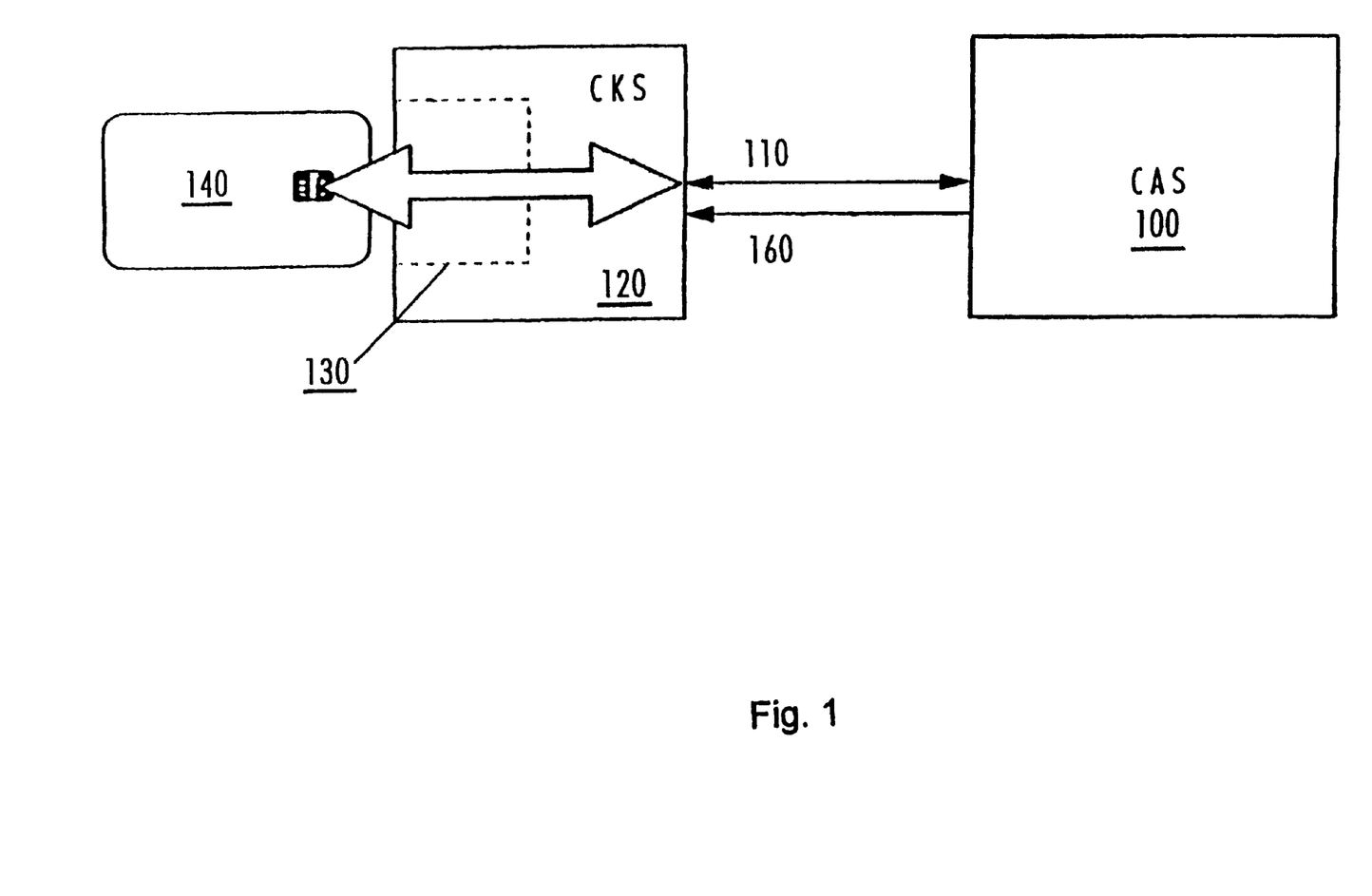
FIG. 1 shows a diagram of the overall concept according to a first embodiment example of the present invention.

A chip-card administration system (CAS) 100 according to FIG. 1 is a system for the personalization, initialization and/or the execution of critical applications using chip cards (e.g., authentication). It is connected to a chip-card control system (CKS) 120 via a communication link 110—i.e., via a connection along which data may be exchanged. Part of the control system 120, a chip-card coupler 130 is responsible for physically contacting a chip card 140.

A chip-card coupler 130 is regarded as an integral part of the chip-card control system here. It conducts the communication with the chip card on a physical level and prompts the chip card to be reset using a corresponding electronic signal. Usually, the chip-card coupler provides to the chip-card control system CKS a command interface, meaning a certain set of commands, which it then converts into the corresponding electronic signal sequence understood by the chip card. The chip-card control system communicates with the chip card on the basis of this command interface.

A communication link 150 realized as a result thereof creates a link between the chip card 140 and the chip-card control system CKS 120. The communication link 150 and the communication link 110 together form a logical communication link that provides the means for the exchange of data between the chip card 140 and the chip-card administration system 100.

In this context, the data exchange that occurs between the CKS and the CAS via the communication link 110 is subject to a certain protocol. For instance, the data transferred from the CAS to the CKS are "packed" or formatted in accordance with this protocol, and the data received by the CKS are "unpacked," meaning the corresponding use data, such as commands for the chip cards, are identified in the incoming data stream and then forwarded to the chip card 140 via the communication link 150.

With the aid of a communication link 160, which has a controlling function, commands and messages may be exchanged between the control system 120 and the chip-card administration system 100, thereby enabling the chip-card administration system to significantly influence the control system.

This does not mean that the two communication links 160 cannot be realized via what is the same connection in terms of hardware. For instance, this may occur if the communication protocol or the control data or the header of the relayed data provide for an identification of a destination and thus identify and define the communication link with regard to its starting point and final destination. To take this example further, the CKS would then be in a position to identify with respect to their final destination (e.g., chip card or the CKS itself) and forward accordingly or process independently the data received by way of the only hardware connection.

The chip-card administration system carries out its tasks when prompted by the chip-card control system CKS. For this purpose, the chip-card control system provides the chip-card administration system CAS with the two communication links 110 and 160 or the CKS communication end points for the development of the communication links that enable communication both with the chip card 140 using the other communication link 150 and the control system 120.

The chip-card administration system CAS features all the keys and algorithms required to perform the obligatory application logic for initialization, personalization or applications relevant to security, such as authentication using a card. The chip-card administration system CAS cannot perform its tasks until the chip-card control system 120 has contacted the card's chip and set up a communication link with the chip.

The chip-card control system is a system that establishes contact with the card's chip and thus enables communication with the chip. This is done by first establishing a physical contact to the card's chip. Then, in accordance with ISO 7816, the chip card is reset, which means that the chip card is prompted by the dispatch of a certain signal, the so-called reset signal, to answer using the response "Answer to Reset ATR." This response contains data that, for example, identify the chip card with regard to the communication protocol to be used, the rhythm frequency, etc. The chip-card control system CKS then provides the first communication link 110 or the corresponding CKS communication end point to the chip-card administration system CAS 100 and thus sets up jointly with the CAS the logical communication link between chip card and chip-card administration system along the communication links 110 and 150. A second communication link 160 between chip-card control system CKS and chip-card administration system CAS is provided by the chip-card control system for purposes of coordinating and controlling both systems.

The logical communication link between chip card and chip-card administration system CAS, consisting of the two communication links 110 and 150, is a transparent communication link—i.e., communication between CAS and chip card is conducted in a transparent fashion. In this context, transparent communication means that the commands and data dispatched by the CAS in any given case, which are designated directly for the chip card, are transferred to the chip card unchanged. By the same token, messages that originated with the chip card and are designated for the CAS are transferred unchanged to the CAS via the transparent logical communication link. Accordingly, if the information units exchanged are so-called data telegrams comprising a control element and a data element, the parts of these data telegrams designated directly for a communication destination, which would be either chip card or CAS, are transferred unchanged to the corresponding communication destination. The chip-card control system thus provides a transparent logical communication link as a connection between chip card and chip-card administration system.

In accordance with the first embodiment example of the invention, the system, for the purpose of handling chip cards or contacting chips, establishes contact with the chip-card administration system CAS as a separate security system and requests the execution of one of these applications for a chip card via the communication link 160. The chip-card control system CKS does the same for the purpose of executing electronic personalization or initializing chip cards or executing a chip-card application. In this context, applications would be electronic administrative processing steps involving chip cards (personalization, initialization) or critical applications using chip cards (e.g., authentication) within the life cycle of a chip card. In case of a personalization, for instance, special keys for each chip card and/or algorithms or other data are applied to the chip card, which thus individualize the chip card and assign a corresponding function, thereby identifying and personalizing it as the special chip card of its respective user.

After the application is requested by the chip-card control system CKS, the chip-card administration system CAS performs a process logic for the requested application, the process logic consisting of a sequence of commands and data to the chip card as well as the appertaining responses that, taken as a whole, represent the requested application. In the course of the application, the commands and data are sent transparently to the chip card via the specified transparent logical communication link, while resulting communications or responses, in turn, are received by the chip card from the chip-card administration system CAS via the same logical communication link. This logical communication link thus establishes a transparent connection between chip card and chip-card administration system CAS. The chip-card control system CKS sets up this link and guarantees the transparent transfer of data telegrams to and from the chip card.

The request for the application sent by the chip-card control system CKS to the chip-card administration system includes information on the communication link to be used. The information transferred via the request contain, among other data, the communication address—i.e., the identification of the communication link's intended entry point into the CKS as well as the communication protocol, which must be used for the provided communication link, and information on the application to be executed. If a chip-card application starts by resetting the chip card according to ISO 7816, this chip-card reset is performed prior to the application requested by the chip-card control system. The results of the reset (Answer to Reset) are likewise transferred to the chip-card administration system as part of the application request.

Even during the execution of the process logic of the requested application, the chip-card control system may, under certain circumstances, be prompted by the chip-card administration system to reset the card—e.g., if this is part of the intended process logic. However, this may also happen if an error occurred during the application's execution. The CAS then requests the reset, and the resulting reset information is communicated to the chip-card administration system once resetting has been completed. After that, the process logic required for the execution of the application may again be performed using transparent communication, or resumed at the appropriate place in case resetting is part of the process logic.

Upon the conclusion of the process logic, the chip-card administration system communicates to the chip-card control system the end of the application along with the result or a result message with regard to the application. This result may consist of a message indicating that the application has been completed successfully. However, the result message could conceivably assume other forms and convey different information. For instance, the result message may contain further information with regard to the application executed. In case the application has been executed successfully, the transparent logical communication link set up for the application's execution may be dismantled again, and the chip card may be de-contacted. If the application was not completed successfully, however, options include making another attempt.

The individual steps that are performed in accordance with the first embodiment example of the invention are summarized below:

1) Chip card is reset, triggered by the chip-card control system CKS or the chip-card coupler following chip contacting.
2) Logical communication link is set up by the chip-card control system for transparent communication between chip card and chip-card administration system.
3) Request for an application, sent to the chip-card administration system, featuring information on the communication link to be used, on the chip reset from Step 1 ("answer to reset" information) and on the application to be executed.
4) Transparent communication between chip-card administration system and chip card for the direct transfer of card commands and responses during the performance of the application's process logic. In this context, transparent communication is ensured by means of the chip-card control system.
5) If required (e.g., in the case of personalization), the chip-card administration system requests a chip reset and reset information from the chip-card control system.
6) Results regarding the application are communicated to the chip-card control system by the chip-card administration system.
7) If applicable, the logical communication link is dismantled by the chip-card control system.

Figure 2:
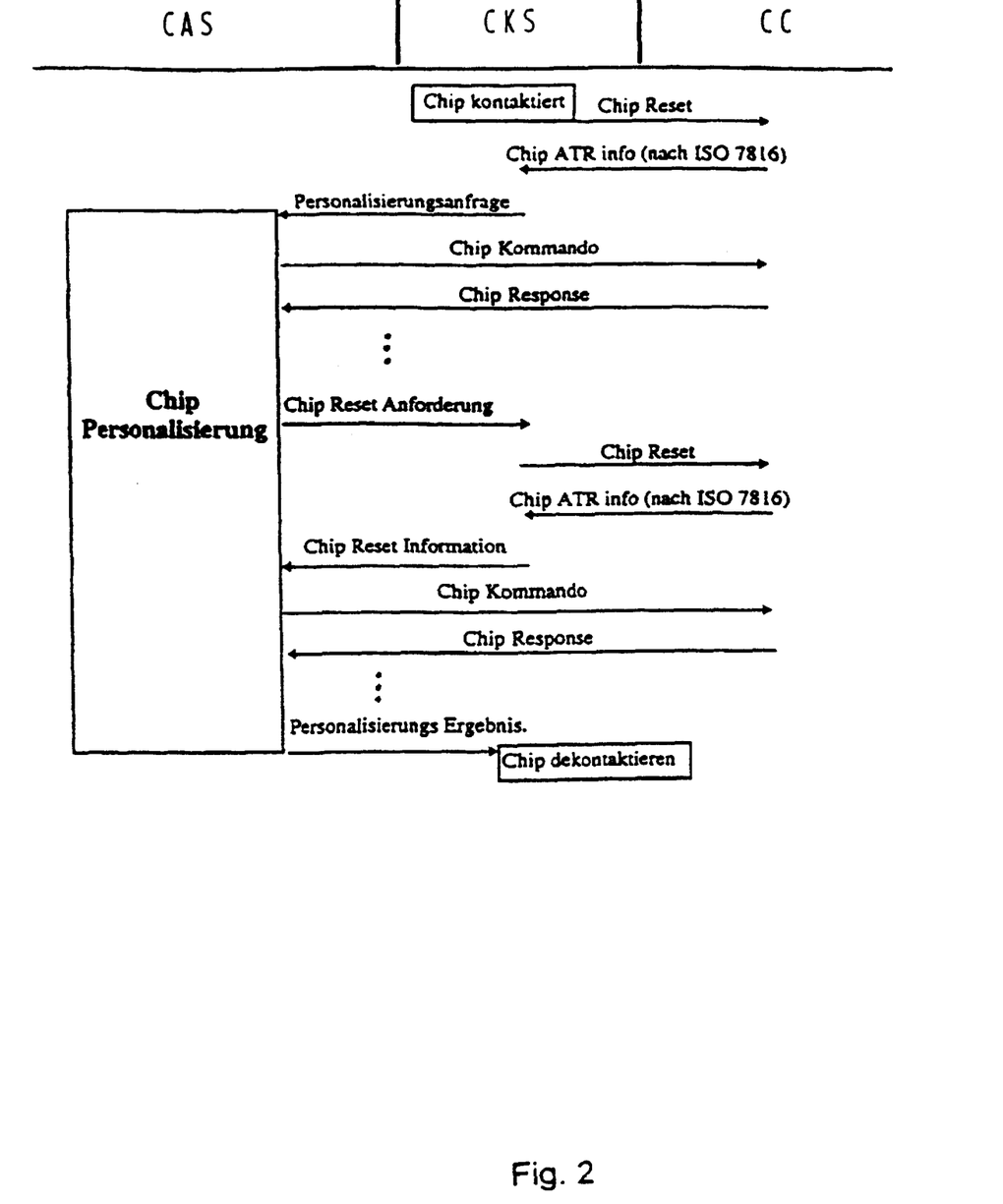
FIG. 2 shows a diagram of the procedural steps according to the first embodiment example of the present invention.

The process of chip-card personalization is represented schematically in FIG. 2 in accordance with the first embodiment example of the invention. The left side represents the CAS, where the personalization is performed. Using the center part, the CKS, commands and responses are transferred transparently to the chip card via the coupler CC.

The specified concept is based on the following basic principles:

Transparent logical communication link:
The chip-card control system provides the means for transparent communication between chip card and chip-card administration system by providing a transparent logical communication link.

Requesting the application:
A request for the execution of an application is sent by the chip-card control system to the chip-card administration system CAS. The request contains information on the intended application and the transparent logical communication link to be used for this purpose, as well as the communication protocol. Consequently, the request carries the following information:
Information regarding the communication (address of the communication link provided, of the protocol to be used)

Identification of the requested application

Information regarding the chip card contacted, from "answer to reset"

If applicable, password for the identification of the chip card's application request within the chip-card control system, so the application requests can be re-identified, Communicating the application result:

The chip-card administration system communicates a result regarding the execution of an application back to the chip-card control system, with such dispatch including the following information:

Result regarding the application, the so-called result message

If applicable, an identification of the chip card's application requests within the chip-card control system The process of personalization is performed in accordance with the concept detailed above by two separate systems, the chip-card control system CKS and the chip-card administration system CAS. In this context, the chip-card control system assumes the part of handling and contacting the chip card and conducts the communication on a physical level using the chip-card coupler. No information on process logic, chip-card command interface, keys and algorithms of electronic administrative chip-card processing and chip-card application has to be stored in the chip-card control system. The chip-card control system sees to it that an electronic link is established to the chip on the card and serves as router, or intermediate stop, for the transparent communication with the chip card. As the prompting or requesting system, the chip-card control system determines the type of application to be executed by the chip-card administration system.

By contrast, the execution of the application takes place in the chip-card administration system. Process logic, algorithms for the application using the chip card and corresponding keys may be stored and secured well here in a separate system. Therefore, specific information on the process logic in the chip card, the chip-card command interface and the algorithms are required only for the development of a chip-card administration system.

The communication between chip-card control system and chip-card administration system may be conducted via a standard network. Using the request mechanism, the protocol and the logical communication link to be used for the application may be defined in the request.

With the aid of a central chip-card administration system, several applications including personalization, initialization and chip-card authentication may be executed at the same time. For this to be possible, the required algorithms and data relevant to security need only be implemented and administrated in a central security system.

Using the mechanism of the application request directed to the chip-card administration system, the various applications may be requested from various partner systems or chip-card control systems. Which communication mechanisms should be used therein is communicated to the chip-card administration system along with the application request.

For instance, a Point-of-Sale (POS) card reader that can be reached via a WAN connection may request the reconfiguration of a chip card while, simultaneously, a personalization system with high production throughput requests a personalization sequence from the chip-card administration system using a LAN connection.

An embodiment example of a "point-of-sale (POS)" personalization using, for instance, a terminal accessible to the client, is given below.

After a client chip card was contacted in a chip-card control system, a personalization request is sent to a central chip-card administration system via a WAN network. For chip-card personalization, the chip-card administration system employs the communication link indicated in the application request. Authentication of the chip card using the chip-card administration system is achieved through mutual authentication. As an additional security mechanism for the action via the WAN/LAN network, additional encoding during communication may be superimposed. Information regarding the encoding method and indications as to the keys to be used may be communicated by the chip-card control system to the chip-card administration system as part of the personalization request.

A typical application could be the reconfiguration of the chip card in accordance with certain client-defined requirements at the Point of Sale a terminal, for instance.

Figure 3:
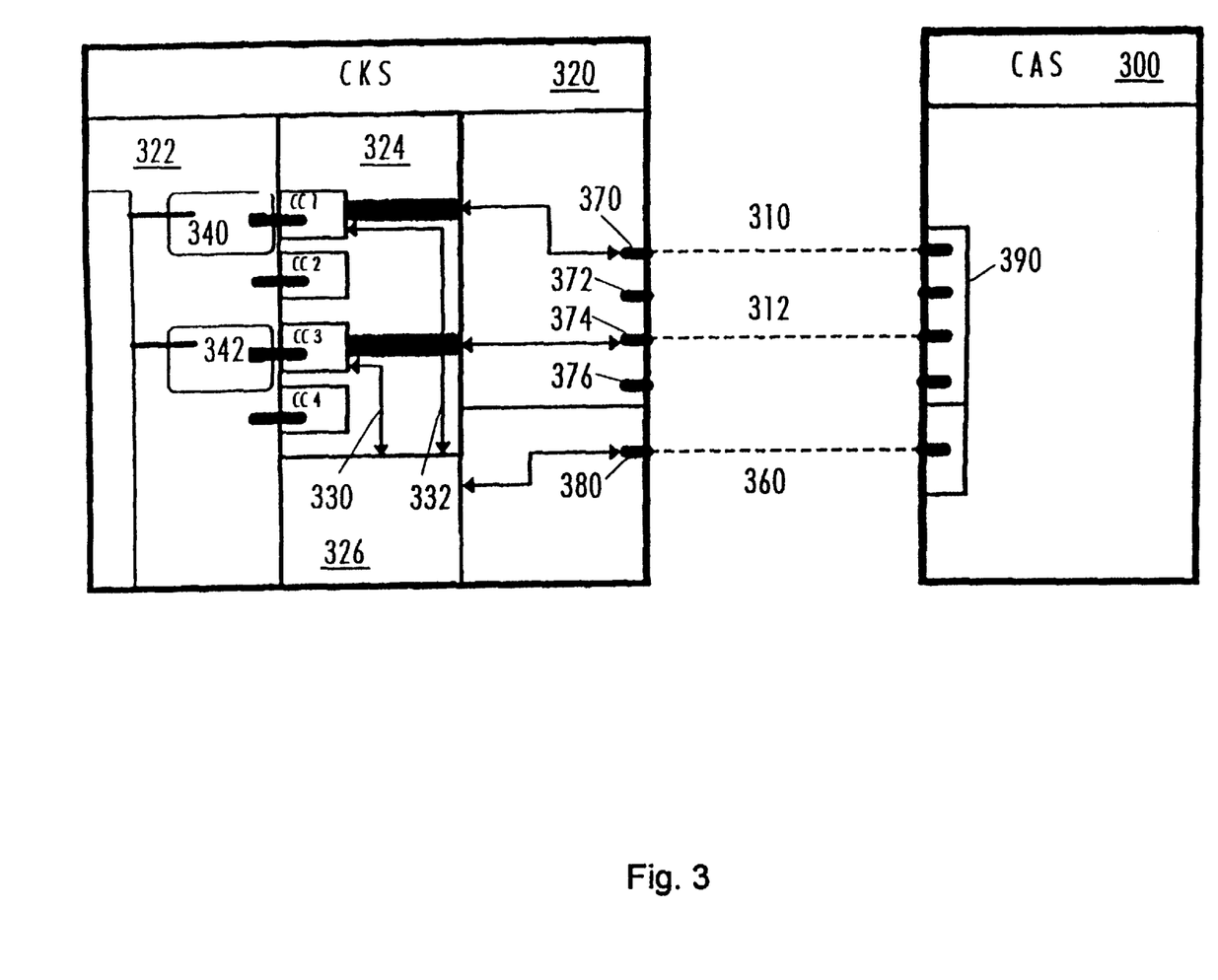
FIG. 3 shows a diagram of the elements of the overall concept according to a second embodiment example of the present invention.

A second embodiment example of the present invention in reference to FIG. 3 is given below.

In this embodiment example, several chip cards 340 and 342 are transported by a transport unit 322 that represents a part of the chip-card control system 320, and contacted by a chip-card coupler unit 324 that hip-card control system 320. The coupler unit comprises several individual couplers CC1 and CC4, each of which can contact one chip card.

A chip-card administration system (CAS) 300 in the example given here is a personalization system again, which executes the personalization process of the chip cards. After the chip cards have been contacted, it is called up by the chip-card control system and the chip-card administration system CAS generates the personalization commands, forwards them and receives and processes the responses received from the chip card. The CAS again is not a part of the chip-card control system but a separate device that communicates with the chip-card control system. The chip-card control system is not responsible for generating or encoding chip-card personalization commands.

Instead of personalization, however, another application may be executed by the CAS analogously—e.g., the programming or encoding of chip cards. In such case, too, the corresponding commands are generated by the CAS and forwarded transparently to the chip card.

For the most part, the chip-card control system serves the purpose of forwarding messages, so that the personalization messages may be sent back and forth between the chip card and the chip-card administration system. The responses of the chip card have been packed in accordance with the defined communication protocol and are forwarded the CAS via the corresponding communication link. As control unit, the chip-card control system is also in charge of transport and the mechanism to contact the chip cards. A control unit 326 is provided for this purpose in the CKS.

In this context, the control unit 326 may control the transport unit in such a way that new chip cards that are to be personalized are fed via a transport unit to, and contacted by, one of the chip-card couplers CCI through CC4. Following successful personalization, the chip cards are then transported further and, if personalization was not successful, sorted out. Following this procedure, chip cards may be personalized in great numbers.

By means of a corresponding request, the CKS prompts for processing of personalization after the chip card was physically contacted. Via the coupler communication links 330 and 332 depicted in the diagram, which represent the connections between the control unit and the chip-card couplers, the CKS, or the control unit 326 of the CKS, moreover effects the reset to be triggered by the couplers CC1 And CC3. It then receives the "Answer to Rest" information given out by the chip card and transfers these to the chip-card administration system along with a personalization request.

The communication links' mode of operations in reference to FIG. 3 is explained in greater detail below. In the present embodiment example, several chip-card couplers CC1 through CC4 are integrated into the CKS. For each of these chip-card couplers CC1 through CC4, the CKS provides a communication link or a corresponding CKS communication end point 370 through 376, which provides the means for a data transfer between the CAS and the chip card. FIG. 3 depicts the two communication links 310 and 312. All personalization commands are forwarded using these links to the corresponding chip-card couplers and then on to the chip card, while the chip-card responses to the commands are sent to the CAS.

For instance, a connection is established using the communication link 310 between the CAS and the CKS communication end point 370; the link continues from there to the coupler CC1, to the chip card 340 and thus forms a logical communication link between CAS and the chip card 340. As far as the chip card 342 is concerned, the connection runs analogously via the communication link 312.

In the case of the present embodiment example, communication between the CKS and the CAS employs a TCP/IP socket connection. A socket is a communication end point. The CKS supplies server sockets 370 through 380, and the CAS—as client—establishes the connection to these server sockets using the client sockets 390. The sockets provided by the CKS may logically be divided into two groups. Each of the groups is used to send different types of messages back and forth between the CKS and the CAS. The two groups are the control socket 380 and the personalization sockets 370 through 376.

The interfaces between the chip-card control system CKS and the external chip-card administration system CAS thus are sockets in a TCP/IP connection. The logical communication links employ such a connection between the chip cards and the chip-card administration system.

Aside from the personalization sockets, therefore, another communication link 360 is set up by the CKS for personalization-control messages—namely, by employing the control sockets. Using these personalization-control messages, the personalization process is triggered by a personalization-request message, and performance is confirmed by means of a result message.

After the chip card was physically contacted, the CKS prompts the card to be reset. The CKS starts the chip-card programming process by sending the personalization-request message to the CAS via the control socket. Based on this message, the CAS is informed of the communication link or the chip-card personalization socket intended for the personalization commands and personalization messages; moreover, of the communication protocol and other information pertaining to the chip card (e.g., reset information) and the request being processed. The CAS, in turn, sends the personalization commands to the corresponding chip-card personalization socket in adherence to the applicable communication protocol. In accordance with the prescribed communication protocol, the CKS then unpacks the personalization commands and sends them to the chip-card coupler. In this context, a part of the personalization commands may be control information for instance, which displays a timeout in effect during the execution of the personalization command for the chip card. The personalization commands themselves are transferred, transparently and without modification, to the chip card. Excepted are only those commands from CKS requesting a reset of the chip. The responses of the chip card, in turn, are transferred transparently to the CAS via the CKS using the same personalization socket and the same communication protocol.

Different types of messages are exchanged using different socket groups. Personalization messages representing personalization commands from the CAS as well as the chip-card responses to these commands are exchanged or transferred via the chip-card personalization socket. During processing, control messages that may serve to request the chip-card personalization process, to report the completion of the personalization process or to exchange status messages are transferred using the control socket. With the exception of the reset requests concerning a chip card, which are transferred by the CAS to the CKS, the personalization messages are transferred transparently between the chip card and the CAS via the CKS. During the personalization process, the CAS may also send chip-card reset requests to CKS via the personalization socket. The control socket, on the other hand, is used to transfer control messages to and from the chip-card administration system. There is precisely one control socket for a chip-card control system. The control messages transferred via this socket include:

Requests for the execution of a personalization
Personalization-result messages.

The personalization sockets are used to transfer personalization messages between the CAS and the CKS during the personalization process of the chip. A chip-card coupler is assigned to one of these personalization sockets based on logic. The chip-card control system internally sets up a communication link between the personalization socket and the corresponding chip-card coupler. The programming commands (except for reset requests) and responses of the chip card are transferred transparently between chip card and chip-card administration system via the logical communication link thus established. The chip-card control system needs only to unpack or forward them in accordance with the communication protocol, the recipient being the chip-card coupler assigned to the socket from which the message was received. In the opposite direction, the chip-card control system has to "pack," or format, the response in accordance with the application-protocol format and send it to the chip-card administration system using the assigned personalization socket.

If there is no reset command for the chip card, the reset must be triggered by means of the corresponding electronic signal at the chip-card contacts. This signal is generated by the chip-card coupler. If, during the personalization process, the chip card needs to be reset, a reset command is dispatched to the CKS via the personalization socket. The CKS must interpret this command and convert it into a corresponding reset command for the chip-card coupler. The chip-card response to the reset (ATR, answer to reset), in turn, is transferred transparently to the CAS.

Upon the completion of the chip card's personalization, the CAS generates a personalization-result message and sends it off. This message comprises the programming result and, possibly, some more information, such as information that is important for further chip-card processing. If an error occurs during the personalization process, the chip card is sorted out as defective by the CKS.

In the present embodiment example, too, the chip-card control system serves as router that receives from the chip-card administration system the data ultimately designated for the chip card and forwards them in a transparent way—i.e., unchanged—to the chip card for which the data is designated. In this embodiment example, however, it is possible to process or personalize several chip cards at the same time.

Using another embodiment example, it is conceivable that several chip-card control systems—if applicable, via various data lines—are connected to the chip-card administration system, that each of these chip-card control systems can process one or several chip cards and that the applications requested by the different chip-card control systems differ from one another. With the aid of a user interface that would be part of the chip-card control system or by assigning production requests to various request types, the CKS may chose from several possible applications, such as personalization, initialization or the execution of another chip-card application like authentication.

An expert may easily conceive of additional modifications of the present invention. For instance, aside from authentication, the chip-card applications mentioned above might include those that provide the means for an interactive exchange of information between chip-card control system and the cardholder.

To give another example, the chip card could be contacted using wireless technology. Instead of a mechanical contact, contacting relies on high-frequency electromagnetic waves. In this case, neither the transfer of data nor the supply of voltage requires a wire. The supply voltage of the chip card could be generated by means of self-inductance on the chip card and triggered by a high-frequency signal. Communication after that would rely on known high-frequency technologies.

What is claimed is:

1. A process for executing an electronic personalization and/or initialization of a chip card and/or a chip card application, characterized by the following process steps:

contacting of the chip card by a first device;

setting up or making available a connection between the first device and a separate second device to form a logical communications channel to permit communication between chip card and the second device via the first device;

request for execution of personalization and/or initialization of the chip card and/or execution of a chip card application by the second device from the first device; and execution of the required personalization and/or initialization of the chip card and/or the requested chip card application using transparent transmission of data and commands between chip card and second device via the logic communications channel, whereby commands and data sent by the second device are intended directly for the chip card, and the chip card command interface is implemented in the second device;

wherein the request for an application contains information on the logic communications channel to be used and the application to be executed;

a process logic required for executing the requested personalization and/or initialization and/or chip card application is executed by the second device; and the second device transmits the result regarding the executed process logic to the first device.

2. A process for executing an electronic personalization and/or initialization of a chip card and/or a chip card application, characterized by the following process steps:

contacting of the chip card by a first device;

setting up or making available a connection between the first device and a separate second device to form a logical communications channel to permit communication between chip card and the second device via the first device;

request for execution of personalization and/or initialization of the chip card and/or execution of a chip card application by the second device from the first device; and execution of the required personalization and/or initialization of the chip card and/or the requested chip card application using transparent transmission of data and commands between chip card and second device via the logic communications channel, whereby commands and data sent by the second device are intended directly for the chip card, and the chip card command interface is implemented in the second device;

wherein the request for execution of a personalization and/or initialization and/or execution of a chip card application contains information regarding the communication, the communications address to be used and the communications protocol to be used and, furthermore, information on the requested application, the contacted chip card and an identification of the requested operation within the first device, and after execution of the personalization and/or initialization and/or chip card application, the first device tears down the logic communications channel.

3. A process for executing an electronic personalization and/or initialization of a chip card and/or a chip card application, characterized by the following process steps:

contacting of the chip card by a first device;

setting up or making available a connection between the first device and a separate second device to form a logical communications channel to permit communication between chip card and the second device via the first device;

request for execution of personalization and/or initialization of the chip card and/or execution of a chip card application by the second device from the first device; and execution of the required personalization and/or initialization of the chip card and/or the requested chip card application using transparent transmission of data and commands between chip card and second device via the logic communications channel, whereby commands and data sent by the second device are intended directly for the chip card, and the chip card command interface is implemented in the second device;

wherein the request for an application contains information on the logic communications channel to be used and the application to be executed;

a process logic required for executing the requested personalization and/or initialization and/or chip card application is executed by the second device; and the second device transmits the result regarding the executed process logic to the first device;

and wherein the process logic executed by the second device is an authentication.

4. A system for executing a personalization and or initialization and/or a chip card application comprising:

a first device for contacting the chip card;

a separate second device for executing the process logic required for the personalization and/or initialization of a chip card and/or for executing a chip card application in response to a request by the first device;

equipment for providing or setting up a connection between the first device and the second device to form a logic communications channel to permit communication between the chip card and the second device via the first device; and equipment for the transparent transmission of data and commands related to the execution between the second device and the chip card via the logic communications channel; whereby commands and data sent by the second device are intended directly for the chip card, and the chip card command interface is implemented in the second device;

wherein the first device furthermore comprises:

equipment for contacting several chip cards;

equipment for forming at least one logic communications channel between each one of the chip cards and the second device via the first device;

equipment for sending several requests for simultaneous execution of several personalizations and/or initializations and/or chip card applications by the second device; and equipment to create one or several server sockets; and wherein the second device furthermore comprises:

equipment to create one or several client sockets; whereby one or several client/server socket pairs are used for simultaneous communication between the chip cards and the second device.

5. A system for executing a personalization and or initialization and/or a chip card application comprising:

a first device for contacting the chip card;

a separate second device for executing a process logic required for the personalization and/or initialization of a chip card and/or for executing a chip card application in response to a request by the first device;

equipment for providing or setting up a connection between the first device and the second device to form a logic communications channel to permit communication between the chip card and the second device via the first device; and equipment for the transparent transmission of data and commands related to the execution between the second device and the chip card via the logic communications channel; whereby commands and data sent by the second device are intended directly for the chip card, and the chip card command interface is implemented in the second device;

wherein a client/server socket pair is used for transmitting commands or data related to the personalization and/or initialization and/or chip card application, and a client/server socket pair is used for transmitting control messages.

6. A system for executing a personalization and or initialization and/or a chip card application comprising:

a first device for contacting the chip card;

a separate second device for executing a process logic required for the personalization and/or initialization of a chip card and/or for executing a chip card application in response to a request by the first device;

equipment for providing or setting up a connection between the first device and the second device to form a logic communications channel to permit communication between the chip card and the second device via the first device; and equipment for the transparent transmission of data and commands related to the execution between the second device and the chip card via the logic communications channel; whereby commands and data sent by the second device are intended directly for the chip card, and the chip card command interface is implemented in the second device;

wherein the process logic executed by the second device comprises an authentication or another security critical application.

7. A system for executing a personalization and or initialization and/or a chip card application comprising:

a first device for contacting the chip card;

a separate second device for executing a process logic required for the personalization and/or initialization of a chip card and/or for executing a chip card application in response to a request by the first device;

equipment for providing or setting up a connection between the first device and the second device to form a logic communications channel to permit communication between the chip card and the second device via the first device; and equipment for the transparent transmission of data and commands related to the execution between the second device and the chip card via the logic communications channel; whereby commands and data sent by the second device are intended directly for the chip card, and the chip card command interface is implemented in the second device;

wherein the second device comprises at least one of the following features:

equipment for executing at least a portion of the process logic required to execute a security relevant application; and the codes required executing a security relevant application.

* * * * *